(12) United States Patent
Buck

(10) Patent No.: US 10,037,125 B2
(45) Date of Patent: *Jul. 31, 2018

(54) SYSTEM AND METHOD FOR DISPLAYING A CONSTANT TIME SELECTION CONTEXT MENU INTERFACE

(71) Applicant: TRADING TECHNOLOGIES INTERNATIONAL INC., Chicago, IL (US)

(72) Inventor: Brian J. Buck, Lisle, IL (US)

(73) Assignee: Trading Technologies International, Inc., Chicago, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/206,649

(22) Filed: Mar. 12, 2014

(65) Prior Publication Data

US 2014/0195411 A1    Jul. 10, 2014

Related U.S. Application Data

(63) Continuation of application No. 13/226,234, filed on Sep. 6, 2011, now Pat. No. 8,713,478, which is a
(Continued)

(51) Int. Cl.
*G06Q 40/00* (2012.01)
*G06F 3/0482* (2013.01)
(Continued)

(52) U.S. Cl.
CPC ............ *G06F 3/0482* (2013.01); *G06F 9/453* (2018.02); *G06Q 40/04* (2013.01)

(58) Field of Classification Search
CPC ...... G06Q 40/04; G06F 3/0482; G06F 9/4446
See application file for complete search history.

(56) References Cited

U.S. PATENT DOCUMENTS

| 4,896,291 A | 1/1990 | Gest et al. |
| 5,581,670 A | 12/1996 | Bier et al. |

(Continued)

FOREIGN PATENT DOCUMENTS

| EP | 1262893 A2 * | 4/2002 | ............. G06F 17/60 |
| EP | 1262893 A2 | 12/2002 | |
| EP | 1262893 A3 | 1/2005 | |

OTHER PUBLICATIONS

Mackenzie, I. S. and Buxton, W. Extending Fitts' law to two-dimensional tasks. In: Proceedings of the SIGCHI conference on Human factors in computing systems. ACM, 1992, pp. 219-226.*

(Continued)

*Primary Examiner* — Kito R Robinson
*Assistant Examiner* — Bolko M Hamerski
(74) *Attorney, Agent, or Firm* — McDonnell Boehnen Hulbert & Berghoff LLP

(57) ABSTRACT

A system and method are provided for a context menu pop-up interface. In one embodiment, the context menu interface may be activated in relation to a second interface, and may include a plurality of selection areas organized around a central selection area. In a preferred embodiment, the sizes of each of the plurality of selection areas increase as a distance to each selection area increases from the central selection area, and the sizes are selected such that the plurality of selection areas can be selected in approximately the same time.

18 Claims, 12 Drawing Sheets

Related U.S. Application Data continuation of application No. 12/431,993, filed on Apr. 29, 2009, now Pat. No. 8,037,422, which is a continuation of application No. 11/415,852, filed on May 2, 2006, now Pat. No. 7,546,550, which is a continuation of application No. 10/794,559, filed on Mar. 5, 2004, now Pat. No. 7,559,036.

(51) Int. Cl.
*G06Q 40/04* (2012.01)
*G06F 9/451* (2018.01)

(56) References Cited

U.S. PATENT DOCUMENTS

| | | | |
|---|---|---|---|
| 5,596,699 A * | 1/1997 | Driskell | G06F 3/0482 |
| | | | 715/834 |
| 5,689,667 A | 11/1997 | Kurtenbach | |
| 5,701,424 A * | 12/1997 | Atkinson | G06F 3/0482 |
| | | | 715/808 |
| 5,737,557 A | 4/1998 | Sullivan | |
| 5,745,717 A | 4/1998 | Vayda et al. | |
| 5,754,176 A | 5/1998 | Crawford | |
| 5,757,358 A | 5/1998 | Osga | |
| 5,790,820 A | 8/1998 | Vayda et al. | |
| 5,798,760 A | 8/1998 | Vayda et al. | |
| 5,805,161 A | 9/1998 | Tiphane | |
| 5,880,723 A | 3/1999 | Driskell | |
| 5,933,138 A | 8/1999 | Driskell | |
| 6,002,402 A * | 12/1999 | Schacher | 715/810 |
| 6,012,046 A | 1/2000 | Lupien et al. | |
| 6,018,722 A | 1/2000 | Ray et al. | |
| 6,064,984 A | 5/2000 | Ferguson et al. | |
| 6,118,427 A | 9/2000 | Buxton et al. | |
| 6,219,053 B1 | 4/2001 | Tachibana et al. | |
| 6,285,367 B1 | 9/2001 | Abrams et al. | |
| 6,408,282 B1 | 6/2002 | Buist | |
| 6,414,700 B1 * | 7/2002 | Kurtenbach | G06F 3/0482 |
| | | | 715/810 |
| 6,549,219 B2 * | 4/2003 | Selker | G06F 3/0482 |
| | | | 345/902 |
| 6,709,330 B1 | 3/2004 | Klein et al. | |
| 6,766,304 B2 | 7/2004 | Kemp, II et al. | |
| 6,772,132 B1 | 8/2004 | Kemp, II et al. | |
| 6,883,143 B2 * | 4/2005 | Driskell | G06F 3/0482 |
| | | | 715/763 |
| 6,915,492 B2 | 7/2005 | Kurtenbach et al. | |
| 6,918,091 B2 | 7/2005 | Leavitt et al. | |
| 6,938,011 B1 | 8/2005 | Kemp, II et al. | |
| 6,993,504 B1 | 1/2006 | Friesen et al. | |
| 7,046,248 B1 | 5/2006 | Perttunen | |
| 7,099,836 B2 | 8/2006 | Cichanowicz | |
| 7,113,190 B2 * | 9/2006 | Heaton | 345/440 |
| 7,127,424 B2 | 10/2006 | Kemp, II et al. | |
| 7,210,107 B2 | 4/2007 | Wecker et al. | |
| 7,212,999 B2 | 5/2007 | Friesen et al. | |
| 7,228,289 B2 * | 6/2007 | Brumfield | G06Q 40/00 |
| | | | 345/440.2 |
| 7,287,232 B2 | 10/2007 | Tsuchimura et al. | |
| 7,302,384 B2 | 11/2007 | Moore | |
| 7,389,268 B1 | 6/2008 | Kemp, II et al. | |
| 7,412,416 B2 | 8/2008 | Friesen et al. | |
| 7,546,550 B1 | 6/2009 | Buck | |
| 7,559,036 B1 | 7/2009 | Buck | |
| 7,562,047 B2 | 7/2009 | Friesen et al. | |
| 7,580,881 B2 | 8/2009 | Singer et al. | |
| 7,580,883 B2 | 8/2009 | Borts | |
| 7,610,237 B1 | 10/2009 | Strauss et al. | |
| 7,711,631 B2 | 5/2010 | Singer et al. | |
| 7,835,972 B2 * | 11/2010 | Almeida | G06Q 40/06 |
| | | | 705/36 R |
| 7,933,828 B2 | 4/2011 | Bandman et al. | |
| 8,027,908 B2 | 9/2011 | Borts | |
| 8,037,422 B1 | 10/2011 | Buck | |
| 8,131,626 B2 | 3/2012 | Langridge | |
| 8,620,794 B2 | 12/2013 | Borts | |
| 2002/0026404 A1 | 2/2002 | Thompson | |
| 2002/0120551 A1 | 8/2002 | Jones | |
| 2002/0122072 A1 | 9/2002 | Selker | |
| 2002/0161690 A1 | 10/2002 | McCarthy et al. | |
| 2002/0178104 A1 * | 11/2002 | Hausman | G06Q 40/04 |
| | | | 705/37 |
| 2003/0004852 A1 | 1/2003 | Burns | |
| 2003/0004853 A1 * | 1/2003 | Ram | G06Q 40/04 |
| | | | 705/37 |
| 2003/0110120 A1 * | 6/2003 | Salehi | 705/37 |
| 2003/0131315 A1 * | 7/2003 | Escher | 715/512 |
| 2004/0019551 A1 * | 1/2004 | Martyn et al. | 705/37 |
| 2004/0193524 A1 | 9/2004 | Almeida et al. | |
| 2005/0004852 A1 * | 1/2005 | Whitney | 705/35 |
| 2005/0027509 A1 | 2/2005 | Moore | |
| 2005/0044031 A1 | 2/2005 | Lebedev | |
| 2005/0060256 A1 * | 3/2005 | Peterson | G06Q 40/04 |
| | | | 705/37 |
| 2005/0080710 A1 * | 4/2005 | Malato et al. | 705/37 |
| 2005/0144113 A1 * | 6/2005 | Opperman | G06Q 40/04 |
| | | | 705/37 |
| 2006/0010066 A1 | 1/2006 | Rosenthal et al. | |
| 2006/0059083 A1 | 3/2006 | Friesen et al. | |
| 2006/0069635 A1 | 3/2006 | Ram et al. | |
| 2006/0161495 A1 | 7/2006 | Wigzell | |
| 2006/0235786 A1 | 10/2006 | DiSalvo | |
| 2006/0253371 A1 | 11/2006 | Rutt et al. | |
| 2007/0005477 A1 | 1/2007 | McAtamney | |
| 2007/0005481 A1 | 1/2007 | Kedia et al. | |
| 2007/0027788 A1 | 2/2007 | Bandman et al. | |
| 2007/0118452 A1 | 5/2007 | Mather et al. | |
| 2007/0156565 A1 | 7/2007 | Singer et al. | |
| 2007/0156570 A1 | 7/2007 | Singer et al. | |
| 2007/0240053 A1 | 10/2007 | Lutnick et al. | |
| 2007/0265954 A1 | 11/2007 | Mather et al. | |
| 2007/0271171 A1 | 11/2007 | Lutnick et al. | |
| 2008/0021806 A1 | 1/2008 | Townsend et al. | |
| 2008/0115079 A1 | 5/2008 | Mather | |
| 2008/0243710 A1 | 10/2008 | Borts | |
| 2009/0319950 A1 | 12/2009 | Borts | |
| 2011/0307371 A1 | 12/2011 | Borts | |
| 2011/0320337 A1 | 12/2011 | Buck | |

OTHER PUBLICATIONS

Mackenzie, I. S. and Buxton, W. Extending Fitts' law to two-dimensional tasks. In: Proceedings of the SIGCHI conference on Human factors in computing systems. ACM, 1992, pp. 219-226. (Year: 1992).*
U.S. Appl. No. 12/504,412, filed Jul. 16, 2009, Borts.
U.S. Appl. No. 14/084,782, filed Nov. 20, 2013, Borts.
"Object-tree Within a Pie Menu," Research Disclosure 315,041, disclosed anonymously, published in Jul. 1990 by Kenneth Mason Publications, Ltd.
"Trading Technologies' X_Trader 7: New Enhancements to Trading Platform Include Top-end Charting Package", The Technical Analyst, Jul./Aug. 2006, pp. 41-44.
Accot, J. and Zhai, S., "Beyond Fitts' Law: Models for Trajectory-based HCI tasks," Proceedings of the CHI' 1997 Conference on Human Factors in Computing Systems, Mar. 22-27, 1997, New York: ACM, pp. 295-302.
Accot, J. and Zhai, S., "Refining Fitts Law Models for Bivariate Pointing," Proceedings of the CHI' 2003 Conference of Human Factors in Computing Systems, Apr. 5-10, 2003, New York: ACM, pp. 1-8.
Christie, J., et al., "A Comparison of Simple Hierarchical and Grid Metaphors for Option Layouts on Small-Size Screens," International Journal of Human Computer Studies, 2004, vol. 60, pp. 1-29.
Fitts, P. M., "The Information Capacity of the Human Motor System in Controlling the Amplitude of Movement," Journal of Experimental Psychology, 1954, vol. 47, pp. 381-391 (Reprint Journal of Experimental Psychology, 1992, vol. 121, No. 3, pp. 262-269).
International Search Report and Written Opinion of International Application No. PCT/US2008/058376, dated Jun. 10, 2008 (dated Jul. 1, 2008).

(56) References Cited

OTHER PUBLICATIONS

Konarev, Petr V., Volkov, Vladimir V., Soklova, Anna V., Koch, Michel H. J. and Svergun, Dmitri I. ; Journal of Applied Crystallography; "Primus: a Windows PC-based system for small-angle scattering data analysis"; 2003; pp. 1-6.

Kurtenbach, et al., "The Hotbox: Efficient Access to a Large Number of Menu-items," Proceedings of the CHI' 1999 Conference of Human Factors in Computing Systems, May 15-20, 1999, New York: ACM, pp. 231-237.

MacKenzie, I.S. and Buxton, W., "Extending Fitts' Law to Two-Dimensional Tasks," Proceedings of the CHI' 1992 Conference of Human Factors in Computing Systems, May 3-7, 1992, New York: ACM, pp. 219-226.

MacKenzie, I.S. and Buxton, W., "The Prediction of Pointing and Dragging Times in Graphical User Interfaces," Interacting with Computers, 1994, vol. 6, pp. 213-227.

MacKenzie, I.S., "A Note on the Information-theoretical Basis for Fitts' Law," Journal of Motor Behavior, 1989, vol. 21, pp. 323-330.

MacKenzie, I.S., "Fitts' Law as a Performance Model in Human-Computer Interaction," Doctoral Dissertation, University of Toronto: Toronto, Ontario, Canada, 1991, pp. 1-140.

MacKenzie, I.S., "Movement Time Prediction in Human-Computer Interfaces," in R.M. Baecker, et al. (Eds.), Readings in Human-Computer Interaction (2nd Ed.), Kaufmann: Los Altos, CA, 1992, pp. 1-19.

Meyer, D.E., et al., "Optimality in Human Motor Performance: Ideal Control of Rapid Aimed Movements," Psychological Review, 1988, vol. 95, No. 3, pp. 340-370.

Oel, et al., "Time Prediction of Mouse-based Cursor Movements," Proceedings of Joint AFIHM-BCS Conference on Human-Computer Interaction IHM-HCI'2001. Lille, France: Sep. 10-14, 2001, vol. II, pp. 37-40.

Schmitt, A. and Oel, P., "Calculation of Totally Optimized Button Configurations Using Fitts' Law," in Proceedings of the HCI International '99 Conference on Human-Computer Interaction, Munich, Germany, Aug. 22-26, 1999. vol. 1, pp. 392-396.

Sears, A., "Layout Appropriateness: A Metric for Evaluating User Interface Widget Layout," IEEE Transactions on Software Engineering, 1993, vol. 19, No. 7, pp. 707-719.

Tognazzini, B. "A Quiz Designed to Give You Fitts," [online], AskTog Website, Feb. 2009. [Retrieved on Mar. 23, 2011] from the Internet: http://www.asktog.com/columns/022DesignedToGiveFitts.html.

Tognazzini, B. "AskTog Reader Mail," [online], AskTog Website, May 2009. [Retrieved on Mar. 23, 2011] from the Internet: http://www.asktog.com/readerMail/1999-05ReaderMail.html.

Whisenand, T.G. and Emurian, H.H., "Some Effects of Angle of Approach on Icon Selection," CHI' Companion 1995, Mosaic of Creativity, May 7-11, 1995, pp. 298-299.

\* cited by examiner

FIG. 2 (Prior Art)

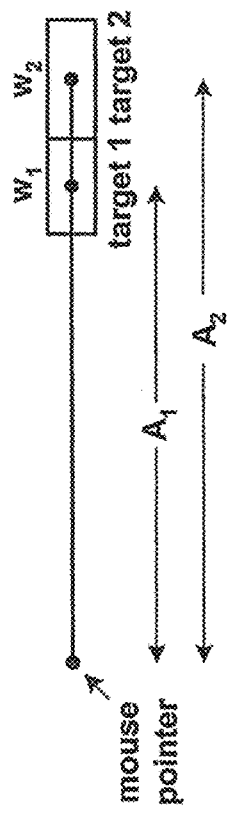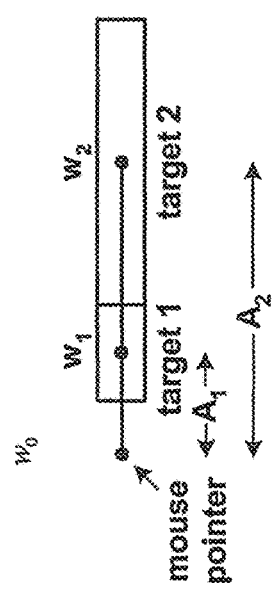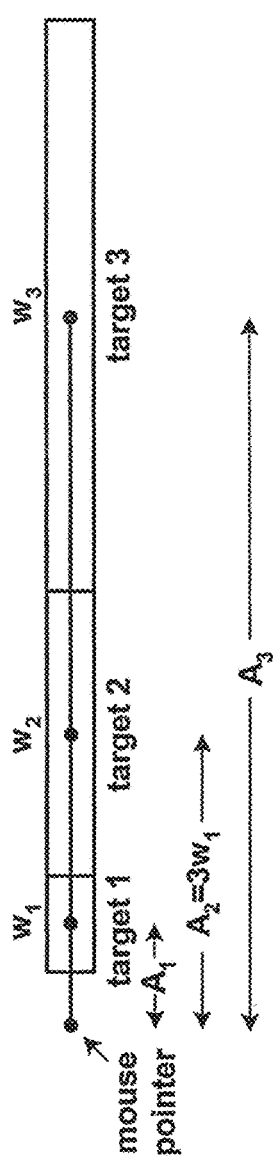
FIG. 6A
FIG. 6B
FIG. 6C

SYSTEM AND METHOD FOR DISPLAYING A CONSTANT TIME SELECTION CONTEXT MENU INTERFACE

CROSS REFERENCE TO RELATED APPLICATIONS

This application is a continuation of U.S. patent application Ser. No. 13/226,234, filed September 6, 2011, now U.S. Pat. No. 8,713,478, which is a continuation of U.S. patent application Ser. No. 12/431,993, filed Apr. 29, 2009, now U.S. Pat. No. 8,037,422, which is a continuation of U.S. patent application Ser. No. 11/415,852, filed May 2, 2006, now U.S. Pat. No. 7,546,550, which is a continuation of U.S. patent application Ser. No. 10/794,559, filed Mar. 5, 2004, now U.S. Pat. No. 7,559,036, the contents of each of which are fully incorporated herein by reference for all purposes.

FIELD OF INVENTION

The present invention is directed towards electronic trading. More specifically, the present invention relates to a system and method for displaying a context menu pop-up interface providing a plurality of choices that can be selected in approximately the same time.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

When a trader selects a tradeable object, the trader may access market data related to the selected tradeable object(s). Referring to FIG. 1, an example communication that might occur between an electronic exchange and a client terminal in accordance with the preferred embodiments is shown. During a trading session, market data 108 in the form of messages may be relayed from a host exchange 106 over communication links 116 and 112 to a client terminal generally indicated as 102. As illustrated in FIG. 1, intermediate devices, such as gateway(s) 104 may be used to facilitate communications between the client terminal 102 and the host exchange 106. It should be understood that while FIG. 1 illustrates the client terminal 102 communicating with a single host exchange, in an alternative embodiment, the client terminal 102 could establish trading sessions to more than one host exchange.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available in the market at certain buy price levels and quantities available in the market at certain sell price levels.

In addition to providing the tradeable object's order book information, electronic exchanges can offer different types of market information such as total traded quantity for each price level, last traded price, last traded quantity, or order fill information. Typically, a trader may view the information provided from an exchange via one or more specialized trading screens created by software running on the client terminal 102. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchange 106, all of which may be considered various types of transaction information. Once generated, user action messages 110 may be sent from the client terminal 102 to the host exchange over communication links 114 and 116.

In a typical trading interface that supports entering orders into electronic exchanges, the speed with which a user can make a selection, such as to define an order quantity and an order type, for example, in entering an order into the market can have an enormous impact on whether a profitable trade can be made. Some interfaces offer a single click trading functionality that enables a trader to quickly send an order to an exchange by simply clicking a location on the interface corresponding to a predetermined price level and a buy/sell action. Using such interfaces, a trader may assign certain actions to be automatically taken in response to a trader selecting a left mouse button or a right mouse button, for example. In one embodiment, each mouse button may be associated with a single combination of an order type and an order quantity such that, for example, a left mouse button may correspond to a limit order for 5 lots, while the right mouse button may correspond to a different combination, such as a limit order for 7 lots, for example. When configured in this way, a trader could select either of the two choices in entering a trade by using either the left mouse button or the right mouse button to click on a price level where the user wishes to trade. Therefore, making each choice would take the same amount of time for a user.

However, the approach of mapping choices to buttons of typical input devices does not scale up. More specifically, since there is a limit on the number of choices that can be made with a pointing device having two or three buttons, such as a mouse or a joystick, only two or three different choices can be selected in constant time. There are a few other currently used interfaces that allow a user to select from a list of many choices. One of such interfaces is a commonly known menu interface illustrated in a block diagram of FIG. 2. To make a selection using the menu interface 200, a user has to move the mouse to one of the choices, such as "Choice 1" 202 in this example, and then click on the selected choice. Then, when a menu 204 corresponding to the selected choice appears, a user has to move the mouse to a location corresponding to a desired sub-choice, such as one of the "Sub-Choices 1-9," and then click again. Looking at the interface 200, the individual sub-choices in the menu 204 cannot all be selected as quickly as each other, since the menu sub-choice on the top, such as "Sub-Choice 1," for example, can be selected more quickly than the second one, which may be selected more quickly than the third one, and so on, because there are progressively longer distances to traverse.

Therefore, using the menu interface, the average time to select a menu item increases with a number of choices on the menu, and the actual time to select an item depends on its relative position in relation to the position of the selection means. This relative spatial dependence has been scientifically proven by Fitts, who developed a model that is now commonly referred to as the Fitts' law. According to the Fitts' law, the time to move and point to a target of width "W" at a distance "A" is a logarithmic function of the spatial relative error ("A/W"). Therefore, referring back to the menu interface in FIG. 2, since the average time to select a target increases with the number of choices "N," the actual time to select an item depends on its relative position to the selection means. This implies then that the menu type interface selection method does not scale well to a large number of choices.

FIGS. 3A-3C illustrate a few other commonly used interfaces, a list box interface 300, a dropdown combo boxes interface 302, and a spin controls interface 304, respectively. However, these interfaces have similar characteristics to the menu interface, and the average time to select a choice in these interfaces depends on the number of selection choices, and how far the choice to be selected is from the top of the control. Referring to FIGS. 3A and 3B, if scrolling is required to make a choice visible, the time to make a selection increased as compared to making a selection using the menu interface 200. Also, in relation to the interface 302, since a user needs to make a desired selection 306 before a set of corresponding selection choices may be displayed, the process of selecting a desired choice is even longer. Then, for the spin control interface 304 in FIG. 3C, the farther the desired choice is from the displayed choice, the longer the selection operation will take. Additionally, for all interfaces illustrated in FIGS. 2 and 3A-3C, the size of the target for the mouse is relatively small, which thereby increases the time that is required to select one of the choices.

For most applications, the difference of a few hundred milliseconds in selecting items is not critical, and the existing interfaces work well. However, in an electronic trading environment, such as First-In-First-Out ("FIFO") markets, or any other market types, where speed means the difference between making and losing money, even a few hundred milliseconds might be critical in the fast moving markets. Therefore, in relation to a trading interface, the speed with which the user can make a selection, such a selection of an order quantity or an order type in entering an order into the market, can have enormous impact on whether a profitable trade can be made.

BRIEF DESCRIPTION OF THE FIGURES

Example embodiments of the present invention are described herein with reference to the following drawings, in which:

Figure 2:
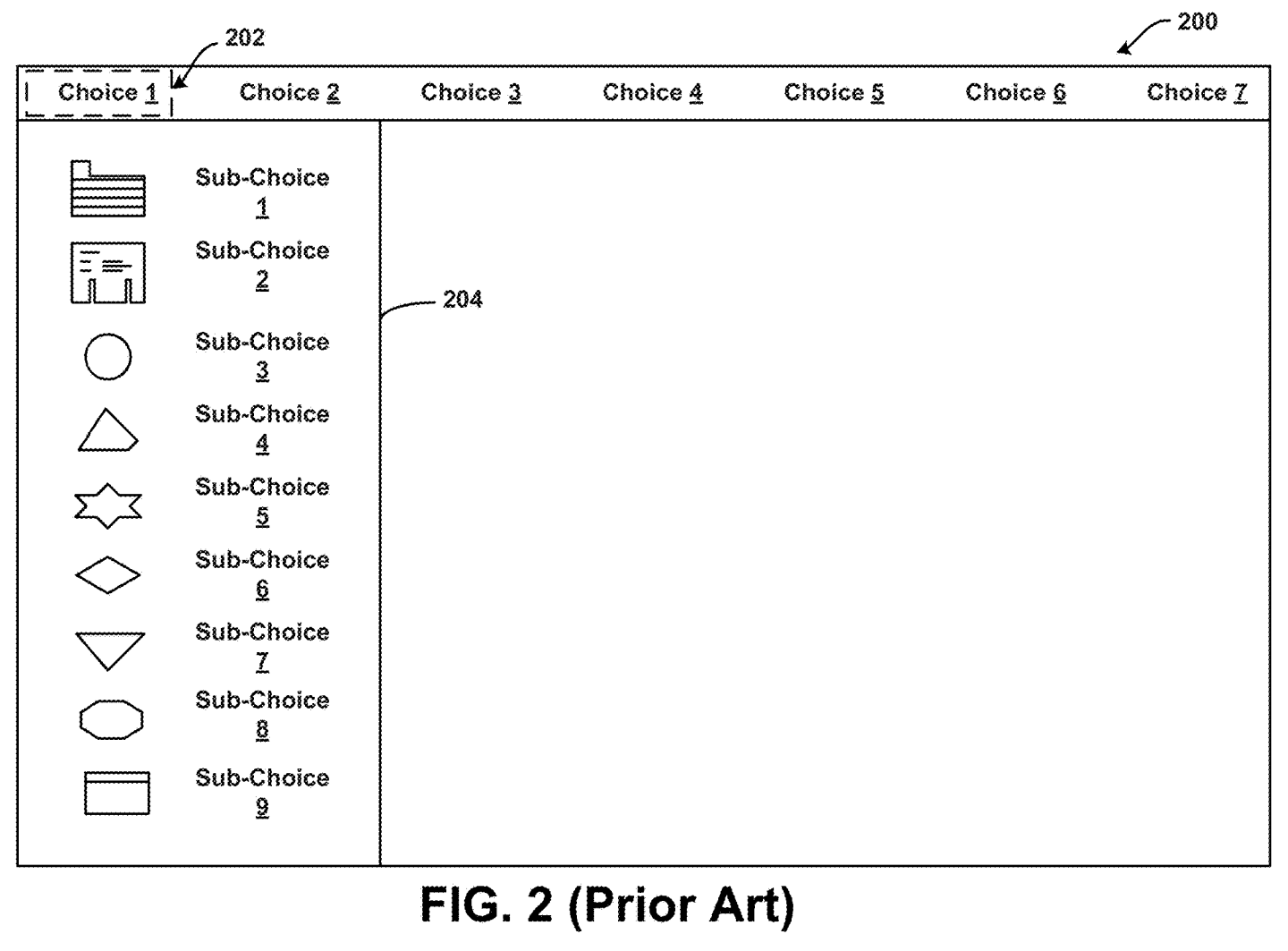

FIG. 2 is a block diagram illustrating a menu interface that is often used to allow a user to select one of many choices using a conventional method;

FIGS. 6A-6C are block diagrams illustrating a method for determining sizes of selection choices in a context menu interface according to one example embodiment using the Fitts' Law principles;

DETAILED DESCRIPTION

I. Context Menu Pop-Up Interface

Figure 1:
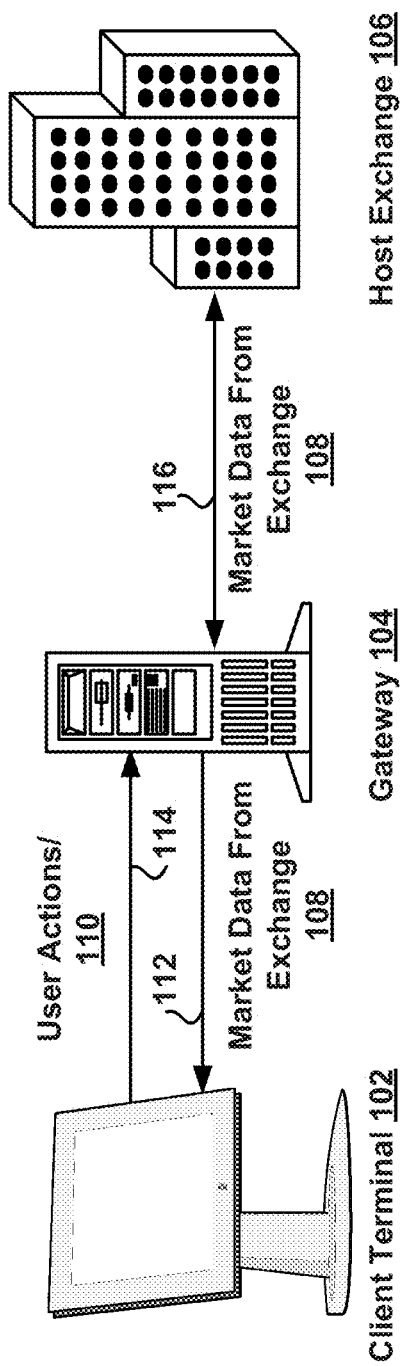
FIG. 1 is a block diagram that illustrates an example network configuration for a communication system utilized to access one or more exchanges.
Figure 3B:
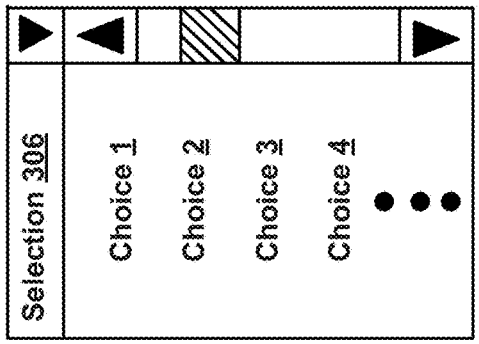
FIGS. 3A-3C are block diagrams illustrating a list box interface, a dropdown box interface, and a spin control interface that are often used to allow a user to select one of many choices using a conventional method.
Figure 3C:
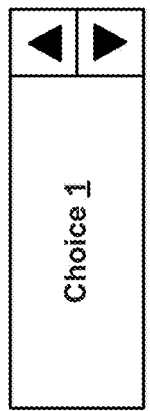
Figure 3A:
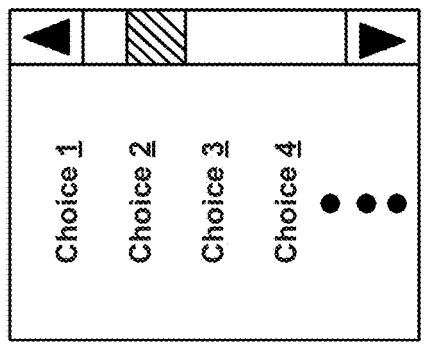

According to one example embodiment, a context menu pop-up interface is provided that offers a plurality of selection choices, all of which can be selected by a user in substantially the same amount of time. The context menu pop-up interface may consist of an arrangement of selection areas or cells, where each selection area boundary and content may be visible, while the background of each selection area is transparent or translucent so that the context menu pop-up interface does not obscure any other interface in relation to which it is activated. According to one preferred embodiment, a plurality of selection areas associated with the interface may be organized around a central selection area, and the sizes of the plurality of areas increase as a distance from the central selection area to each selection area increases. Additionally, the sizes of the selection areas are selected such that each of the plurality of selection areas can be selected in approximately the same time. In one preferred embodiment, the sizes of the selection areas are controlled using the Fitts' law principles, or variations thereof.

For example, the context menu pop-up interface can be used in relation to a trading interface. The trading interface may include an order entry region with a plurality of locations for receiving commands to send trade orders to an electronic exchange. When the context menu pop-up interface is activated upon detecting a user activation request command when a cursor associated with a user input device, such as a mouse, is located in relation to one of the order entry locations, the context menu pop-up interface may provide a number of selection areas associated with a plurality of order related parameters. In such an embodiment, the order related parameters may include order quantities, order types, or any actions/functions to be taken in relation to pending orders, or orders to be sent to an exchange. For example, when a user selects one of the selection areas associated with an order quantity, the selected order quantity may be used to automatically populate a quantity field in a pending order ticket.

While the present invention is described herein with reference to illustrative embodiments in relation to trading interfaces, it should be understood that the present invention is not limited thereto, and could be used in relation to any other interfaces providing a number of selection choices. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

The example embodiments that will be used hereinafter to describe different configurations and functionalities of the context menu interface will be described in reference to trading interfaces. However, it should be understood that the context menu interface could be used in relation to any interface that allows a user to make selection choices, set values, or define parameters.

Figure 4:
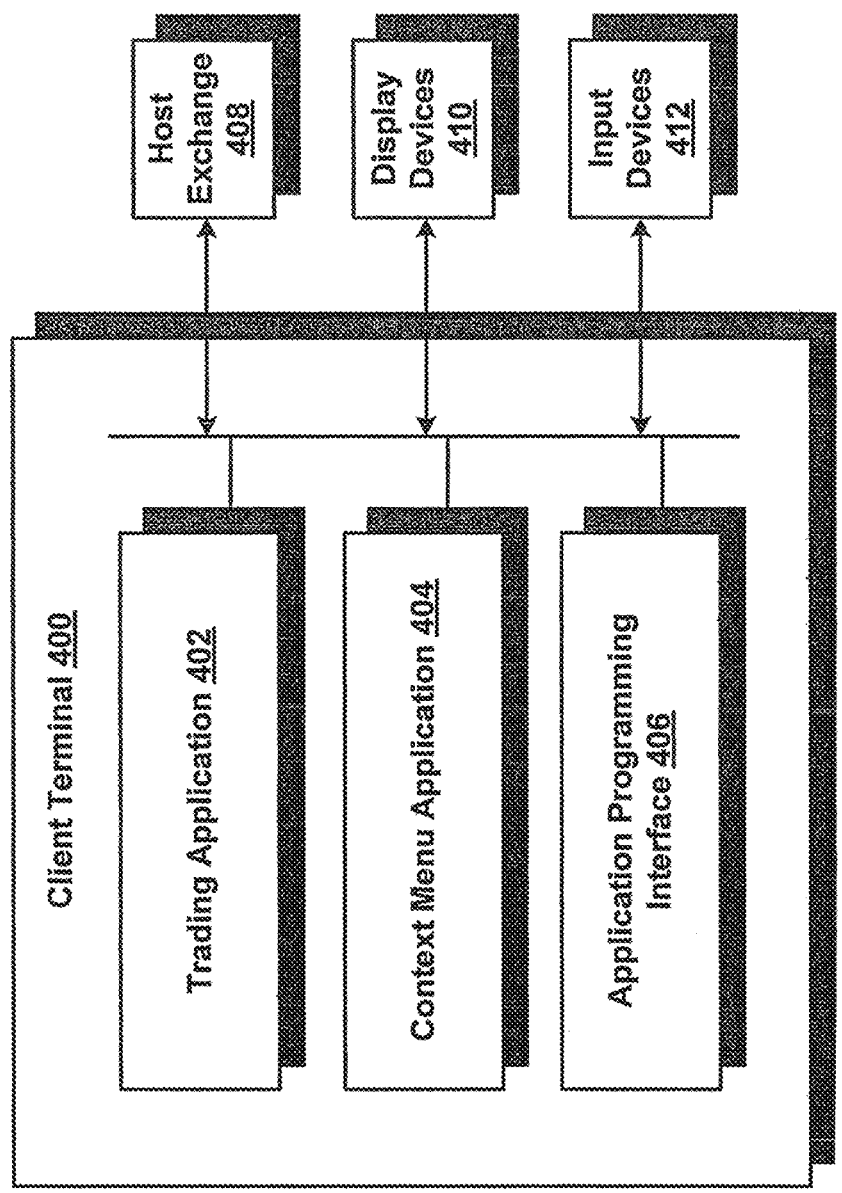
FIG. 4 is a block diagram illustrating an example client device that can be used to carry out the embodiments of the present invention.

FIG. 4 is a block diagram illustrating an example client terminal 400 with a number of layers defining different stages that may be used to implement embodiments of the present invention. The client terminal 400 can be a computer, such as a workstation, desktop, handheld device, and so forth, that allows a trader to trade one or more tradeable objects that are offered at exchanges. The client terminal 400 includes a trading application 402, a context menu application 404, and an application programming interface 406. The client terminal 400 may also include at least a processor and memory (both of which are not shown in the figure, but are well-known computer components). Preferably, the processor has enough processing power to handle and process various types of market information. The more market information is received and processed, the more processing power is preferred. However, any present day processor has enough capability to perform at least the most basic part of the present invention. Also, it should be understood that memory may include any computer readable medium. The term computer readable medium, as used herein, refers to any medium that participates in providing instructions to a processor unit for execution.

Preferably, the trading application 402 has access to market information through the interface 406, such as through an application programming interface ("API"), and the application 402 can also forward transaction information to the host exchange 408 via the API 406. In a preferred embodiment, when the trading application 402 receives market information from the exchange 408, it may arrange and display the received information in many different ways, depending on how the trader prefers to view the information on the visual output display devices 410. The display devices 410 could be a CRT-based video display, an LCD-based display, a gas plasma-panel display, a display that shows three-dimensional images, or a different display type. Also, the display device 410 could be a combination of separate display devices that can together create a composition in the user's visual field of the context menu and the interface, such as a head-mounted monocular see-through display that holds the context menu used together with another display that holds the trading interface. In the preferred embodiment, the trading application 402 creates specialized interactive screens that enable traders to, among other things, enter and execute orders, obtain market quotes, and monitor positions. The range and quality of features available to the trader on his or her trading screen may vary according to the specific software application being run. In addition to, or in place of interactive screens, the client terminal 102 could run automated types of trading applications. The trading application 402 may also receive input signals from traders via input device 412. The input devices can include, for example, a mouse, a keyboard, or any other input means selected by a user.

The preferred embodiment may be implemented on any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIG. 1 could also be placed using any other trading application as well. Additionally, the preferred embodiments are not limited to any particular product that performs translation, storage, and display functions.

The context menu application 404 is preferably a software application that interfaces with the trading application 402 to display a context menu interface. In a preferred embodiment, the context menu interface provides a plurality of selection choices that are arranged in such a manner so that each choice can be selected in approximately equal amount of time. It should be understood that the context menu application 404 may be configured to work with any type of display to provide the functionality described hereinafter.

III. Constant Time Selection Context Menu Pop-Up Interface

According to example embodiments that will be described in greater detail below, a context menu interface offers a user a plurality of selection choices that can be selected in substantially the same time. More specifically, according to one example implementation, the context menu interface may be activated by a user in relation to another interface, such as a trading interface, and may consist of an arrangement of selection areas or cells, where each cell boundary and content may be visible, while the background of each cell is transparent or translucent. Using such an embodiment, the context menu interface may provide meaningful context selection choices, while not obscuring the trading interface. As will be described in greater detail below, each cell of the context menu may be associated with one or more selection parameters or actions to be taken in response to selecting a cell, and the actions associated with each cell may be user configurable.

Also, preferably, choices/actions presented in relation to each cell may change based on a portion of an underlying interface in relation to which the context menu is activated. Thus, for example, if the context menu is activated in relation to an order entry area of the trading interface, each cell of the context menu may provide order related selection choices. The order related selection choices may be as simple as a single value that can be used to define an order quantity, or as complicated as a collection of several parameters, such as an order quantity and an order type. Alternatively, cell choices may map to a plurality of functions, the execution of which may result in determining one or more parameters/values or actions. Also, in another embodiment, it should be understood that each cell may be associated with a set of time-based choices, so that a cell may display different selection choices depending on the time of day, month, or year when the context menu interface is activated.

1. Functionality

Figure 5:
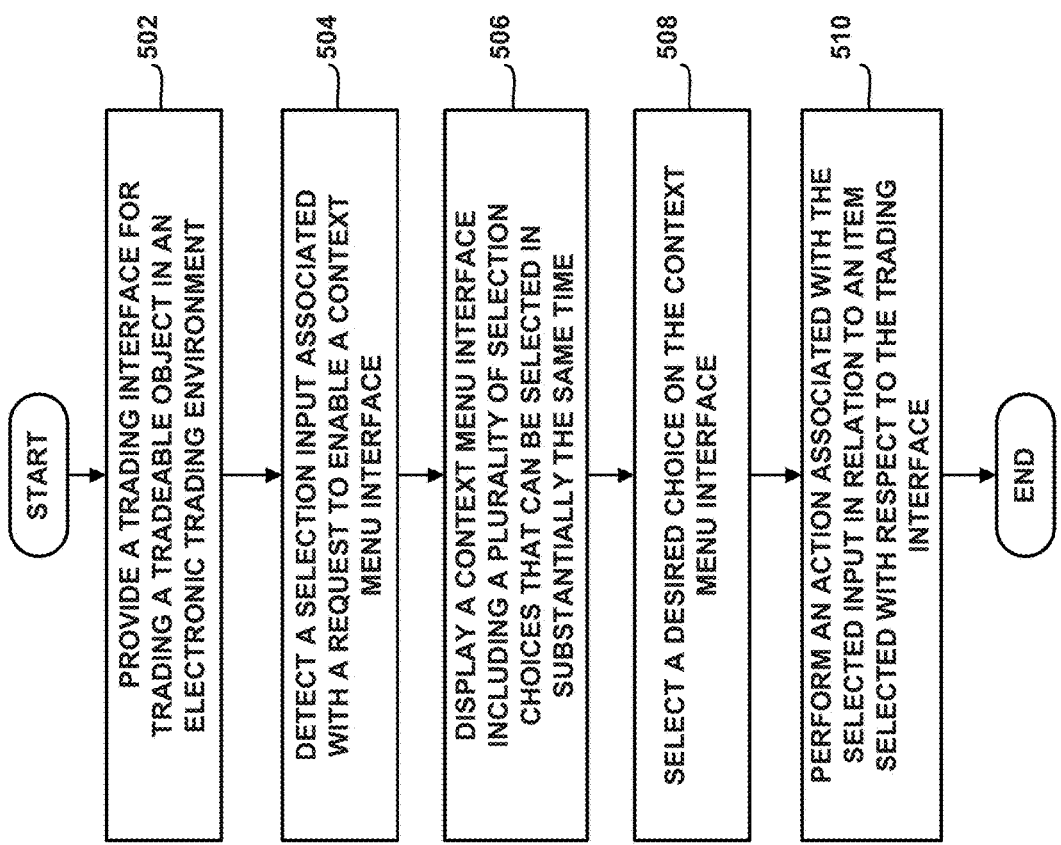
FIG. 5 is a flowchart illustrating an example method for using the context menu interface in relation to one example interface, a trading interface.

FIG. 5 is a flowchart illustrating an example method for an improved trading interface using a context menu according to one example embodiment. The flowchart of FIG. 5 shows the functionality and operation of one possible implementation of the present embodiments. In this regard, each block may represent a module, a segment, or a portion of code, which includes one or more executable instructions for implementing specific logical functions or steps in the process. It should be understood that alternative implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. Also, the method 500 will be described in relation to the components illustrated in FIG. 4; however, it should be understood that different components could also be used to execute the method. Further, it should be understood that the context menu pop-up interface could also be used in relation to different types of interfaces, and the trading interface is only an example interface that will be used to describe the functionality of the context menu pop-up interface.

Referring to FIG. 5, at step 502, the trading application 402 provides a trading interface for trading a tradeable object in an electronic trading environment. As mentioned in relation to FIG. 4, the trading interface may take a format of the MD Trader™-style display; however, it should be understood that the context menu interface could be used in relation to different display types. In one embodiment, the trading interface may include an order entry region with a plurality of locations that can be used for receiving commands to send trade orders to an electronic exchange. In such an embodiment, the locations may be arranged along a common axis of prices, such as a static price axis, as in the MD Trader™-style display, and each location may be associated with a price along the common price axis. At step 504, the context menu application 404 detects an activation selection input, or an activation command, associated with a request to enable a context menu interface. In one example embodiment, a user can activate the context menu interface by simply pressing an input choice of an input means. In an embodiment where the input means includes a mouse, the user may activate the context menu by simply pressing, and alternatively holding, the right/left mouse button on a particular location of the trading interface. However, it should be understood that the context menu interface could be activated using different selection inputs, such as voice activation inputs, a combination of keyboard inputs, or via any other user-configurable means. Also, it should be understood that the context menu interface could be automatically activated upon detecting triggers or events received from outside sources.

At step 506, the context menu application 404 displays a context menu interface in relation to the trading interface. In a preferred embodiment, the location and selection choices corresponding to each cell of the displayed context menu interface may depend on the position of a selection means, such as a mouse, at the time of detecting the activation selection input. For example, if the context menu interface is activated in response to pressing the right mouse button in relation to a buy/sell price level displayed on the trading interface, the context menu interface could be centered on the selected price level corresponding to the current mouse location. Also, in such an embodiment, the selection choices of the context menu could correspond to a number of order related parameters, and may define, for example, a number of order quantities, order types, the combination thereof, or any other order related parameters or functions configured by a trader.

At step 508, the context menu application 404 detects a user input selecting a choice on the context menu interface. In one embodiment, a user can select a desired choice by simply moving the selection means to a cell on the context menu corresponding to the desired choice and then selecting that cell. For example, a user can move a mouse to the cell that corresponds to the user's choice, and then may click on the desired choice. In an alternative embodiment, when a user activates the context menu interface by a right mouse button click, for example, the user may then move the mouse to the cell corresponding to the desired choice, while still having the mouse button pressed down, and then may release the right mouse button when the mouse is positioned over the desired selection choice. In such an embodiment, a trader is essentially performing a mouse gesture that consists of detecting a right mouse button down action, then moving the mouse in a particular direction for a particular distance, and then detecting a release of the mouse button at the location of the desired selection choice.

Once the selection is made in relation to the context menu, the context menu application 404 may disable the context menu interface, and, at step 510, the trading application 404, or any other application, may perform one or more actions implied by or associated with the selected choice. For example, if the context menu interface is activated in response to selecting a price level corresponding to a buy order, and then a specific value is selected in relation to the context menu interface, the selected value may be used to dynamically populate an order quantity field in an order ticket of an order that is being placed at the selected price. However, as mentioned in earlier paragraphs, it should be understood that each cell could be associated with more complex actions, or functions, which, when executed, may result in one or more actions to be taken or one or more values to be applied in relation to the underlying item.

2. Display Layout Creation

The example context menu interfaces that will be described in greater detail below include a plurality of selection choices that can be selected in approximately the same time upon activating the context menu. According to one example embodiment, the layout and sizes of the selection choices on the context menu interface are based on the principles of the Fitts' law. FIGS. 6A-6C are block diagrams illustrating and explaining principles that were used to construct one example layout for the context menu interface.

The Fitts' law can be used to measure and predict how long it will take for a user to move a mouse from one location, and to click on a target selection choice. The following equation represents the Shannon formulation of the Fitts' law:

$$MT = a + b\log_2\left(1 + \frac{A}{w}\right) \quad \text{EQN(1)}$$

In EQN(1), "MT" is a movement time to a target that is distance "A" away, and which has a width "w" measured in the direction of motion to the target. EQN(1) also includes two constants "a" and "b," which are typically determined by regression on a set of data samples, and may be on the order of 100-400 milliseconds. However, it should be understood that the values used for "a" and "b" may depend upon the actual type of a pointing device used, such as a mouse, a track ball, or a tablet. Also, it should be understood that while the example embodiments will be explained using the Fitts' law representation of EQN(1), different Fitts' law representations could also be used.

According to one example embodiment, a context menu interface may include a series of adjacent targets that can be selected by a user in substantially the same time using a mouse pointer or any other selection means. FIG. 6A illustrates two example adjacent targets, "target 1" and "target 2," that will be used to explain one example embodiment for constructing the context menu interface. The following equations represent the Fitts' law for the two targets:

$$MT_1 = a + b\log_2\left(1 + \frac{A_1}{w_1}\right) \quad \text{EQN(2)}$$

$$MT_2 = a + b\log_2\left(1 + \frac{A_2}{w_2}\right) \quad \text{EQN(3)}$$

Based on EQN(2) and EQN(3), for the movement times $MT_i$ to be equal for each target, $MT_1=MT_2$, $A_1/w_1$ and $A_2/w_2$ should be equal. Therefore, to construct a series of adjacent targets with the same selection time, the width of each target should be preferably adjusted so that the movement time from the mouse pointer to each target is the same. For the embodiment illustrated in FIG. 6B, where $MT_1$ is set equal to $MT_2$, $A_2$ can be represented with the following equation:

$$A_2 = A_1 + 1/2(w_1 + w_2) \quad \text{EQN(4)}$$

Substituting EQN(4) for $A_2$ in EQN(3), $MT_2$ can be represented with the following equation:

$$MT_2 = a + b\log_2\left(1 + \frac{A_1 + 1/2(w_1 + w_2)}{w_2}\right) \quad \text{EQN(5)}$$

Referring back to the initial assumption of $MT_1=MT_2$, and using EQN(5):

$$\frac{A_1}{w_1} = \frac{A_2}{w_2} = \frac{A_1}{w_2} + \frac{1}{2} + \frac{w_1}{2w_2} \quad \text{EQN(6)}$$

Then, solving EQN(6) for $w_2$:

$$w_2 = \frac{w_1(A_1 + 1/2w_1)}{(A_1 - 1/2w_1)} \quad \text{EQN(7)}$$

If $A_1=w_1$, as in the block diagram of FIG. 6B, then:

$$w_2 = \frac{w_1(w_1 + 1/2w_1)}{(w_1 - 1/2w_1)} = 3w_1 \quad \text{EQN(8)}$$

Using the model described above, if an additional target, "target 3," is to be added to the right of "target 2", such as illustrated in FIG. 6C, and where $A_2=3w_1$, in order for the movement times from the mouse pointer to each of the three targets to be the same, $A_1/w_1$ should be equal to $A_3/w_3$. Referring to FIG. 6C, and observing that $A_3=A_1+\frac{1}{2}w_1+w_2+\frac{1}{2}w_3$, $A_1=w_1$, and $w_2=3w_1$, and substituting the relationships into $A_1/w_1=A_3/w_3$, while solving for $w_3$, results in $w_3=9w_1$.

In general, if we define a central target, "target 0," as a box centered around the initial mouse pointer, and the initial target has a width of $w_0=w_1$, and the recurrence relation for the successive amplitudes are $A_1=\frac{1}{2}(w_0+w_1)$ and $A_k=A_{k-1}+\frac{1}{2}(w_{k-1}+w_k)$, the following equation defines the distance to the "$k_{th}$" target.

$$A_k = 1/2(w_{k-1} + w_k) + 1/2(w_{k-2} + w_{k-1}) + \\ 1/2(w_{k-3} + w_{k-2}) + \ldots + 1/2(w_0 + w_1) \quad \text{EQN(9)}$$

-continued $$A_k = \left(\sum_{i=1}^{k-1} w_i\right) + 1/2(w_0 + w_k)$$

Then solving for $w_k$ using the initial assumption of $$\frac{A_k}{w_k} = \frac{A_1}{w_1},$$

results in $$w_k = w_1 \frac{A_k}{A_1}.$$

Substituting for $A_k$ and $A_{k-1}$ into $$w_k = w_1 \frac{A_k}{A_1},$$

and then solving for $w_k$ using geometric series properties results in EQN(10):

$$w_k = w_1\left(1 + \frac{2w_1}{w_0}\right)^{k-1} \qquad \text{EQN(10)}$$

When substituting EQN(10) into EQN(9), $A_k$ can be represented using the following equation:

$$A_k = \frac{w_0}{2}\left[\left(1 + \frac{2w_1}{w_0}\right)^{k-1}\right] + \frac{w_1}{2}\left(1 + \frac{2w_1}{w_0}\right)^{k-1} = \qquad \text{EQN(11)}$$

$$\left(\frac{w_0 + w_1}{2}\right)\left(1 + \frac{2w_1}{w_0}\right)^{k-1}$$

It should be understood that the widths of the target 0 and the target 1 can be different as well, and the embodiments described below are not limited to the initial assumption of $w_0=w_1$ that was used in relation to EQN(9). Table 1 below illustrates a plurality of example sets of values for $w_0$, $w_1$, $w_2$, $w_3$, $w_4$, and $w_5$, where $w_0 \neq w_1$, and $w_0=1$.

TABLE 1

| $w_0$ | $w_1$ | $w_2$ | $w_3$ | $w_4$ | $w_5$ |
|---|---|---|---|---|---|
| 1 | 0.5 | 1.0 | 2.0 | 4.0 | 8.0 |
| 1 | 0.9 | 2.52 | 7.06 | 19.76 | 55.32 |
| 1 | 1.2 | 4.08 | 13.87 | 47.16 | 160.36 |
| 1 | 1.5 | 6.0 | 24.0 | 96.0 | 384.0 |
| 1 | 2.0 | 10.0 | 50.0 | 250.0 | 1,250.0 |

Figure 7:
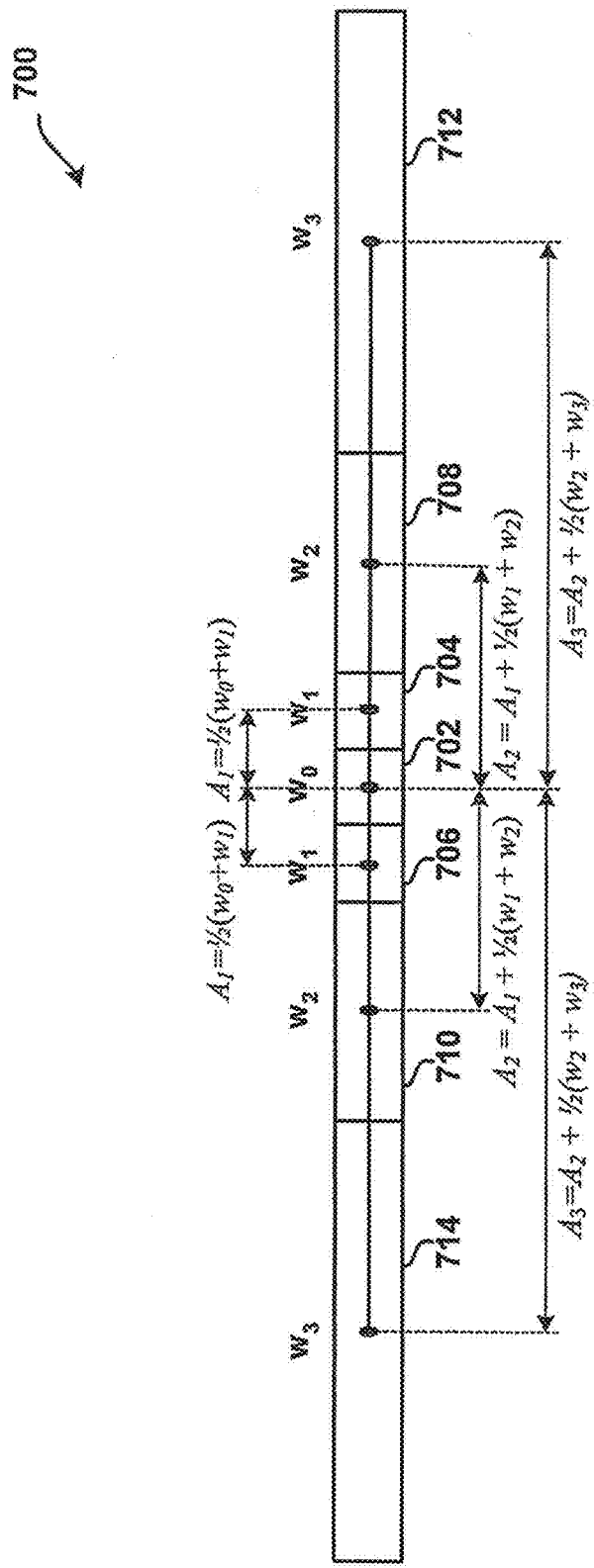
FIG. 7 is a block diagram illustrating one example context menu interface created based on the principles described in relation to FIGS. 6A-6C.

It should be understood that the example context menu interface can be extended by adding menu cells to the left of the first target cell as well. FIG. 7 is a block diagram illustrating one example context menu interface 700 that may be created based on the principles described above. The context menu 700 includes seven targets 702, 704, 706, 708, 710, 712, and 714 that are positioned adjacent to each other, and having their widths determined using the Fitts' law principles. Therefore, based on the embodiments described in reference to the preceding figure, the widths of targets 704, 706 are equal to the width of the target 702, while targets 708, 710 are three times wider than targets 704, 706, while targets 712, 714 are nine times wider than targets 708, 710.

Now, let's assume that the construction of the context menu 700 will be extended into two dimensions. The following equation represents a modified Fitts' Law, and defines a movement time "MT" as a function of not only an amplitude of the movement "A," and a width of a target "w" as measured in the direction of the movement, but also as the function of the height of the target as measured in a direction perpendicular to the direction of movement:

$$MT = a + b\log_2\left(1 + \sqrt{\left(\frac{A}{w}\right)^2 + \eta\left(\frac{A}{h}\right)^2}\right) \qquad \text{EQN(12)}$$

In EQN(12), "a" and "b" are constants, which may be on the order of −50 to 200 milliseconds for "a", 100 to 170 milliseconds for "b", and "η" is another constant, which may be in the range from 1/7 to 1/3. It should be understood that the values given for the coefficients are only example values, and a different set of values can be used depending on the type of a pointing device, for example. EQN(12) is based on the research performed by Accot and Zhai, who described their research results in the publication entitled "Refining Fitts' Law Models for Bivariate Pointing." However, it should be understood that different variations of EQN(12) could also be used to determine heights and widths of the cells corresponding to the multi-dimensional context menu interfaces.

Using EQN(12), it can be observed that not only the width of each target, but also the height of each target plays an important role in determining how much time it will take a user to select a target. Therefore, in order for the movement times to be equal, $MT_1=MT_k$, and using EQN(12), the following relationship should be satisfied:

$$\left(\frac{A_1}{w_1}\right)^2 + \eta\left(\frac{A_1}{h_1}\right)^2 = \left(\frac{A_k}{w_k}\right)^2 + \eta\left(\frac{A_k}{h_k}\right)^2 \qquad \text{EQN(13)}$$

Based on EQN(13), in order to achieve substantially equal movement times, targets further away are preferably not only wider, but also taller. It should be understood that there could be many pairs of values $(w_k,h_k)$ that could satisfy EQN(13). In one example embodiment, the construction of the interface may be simplified by using symmetry in any two dimensional construction, such that the width of each target will equal its height, $h_k=w_k$, for all k, which then results in the following relationship:

$$\left(\frac{A_1}{w_1}\right)^2(1+\eta) = \left(\frac{A_k}{w_k}\right)^2(1+\eta) \text{ or } \frac{A_1}{w_1} = \frac{A_k}{w_k} \qquad \text{EQN(14)}$$

It should be understood that as the widths of the target 0 and the target 1 can be different, the width and height of each target could be different as well. Table 2 below illustrates a plurality of example sets of values for $w_2$ and $h_2$, where $w_1=1$, $h_1=1$, $A_1=1$, and $\eta=0.142857$.

13

TABLE 2

| $w_2$ | $h_2$ | $A_2$ |
|---|---|---|
| 2.708479 | 6 | 2.854239 |
| 2.743368 | 5 | 2.871684 |
| 4 | 2.153846 | 3.5 |
| 6 | 2.232625 | 4.5 |

3. Example Menu Interface Layouts

Figure 8A:
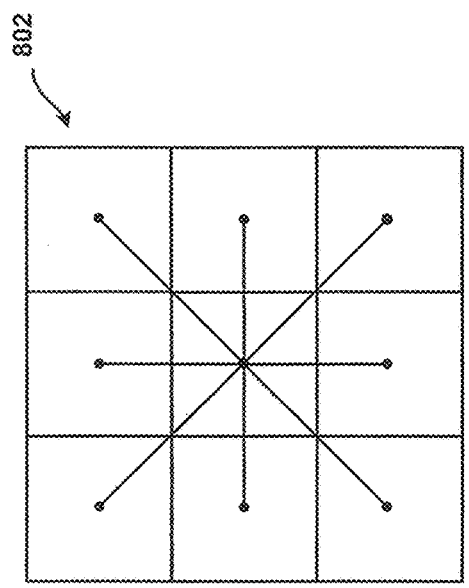
FIGS. 8A-8C are block diagrams illustrating three example configurations of context menu interfaces created based on the principles described in reference to FIGS. 6A-6C and FIG. 7.
Figure 8B:
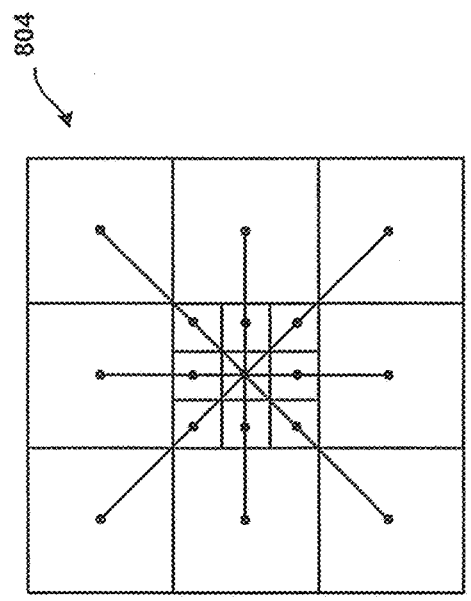
Figure 8C:
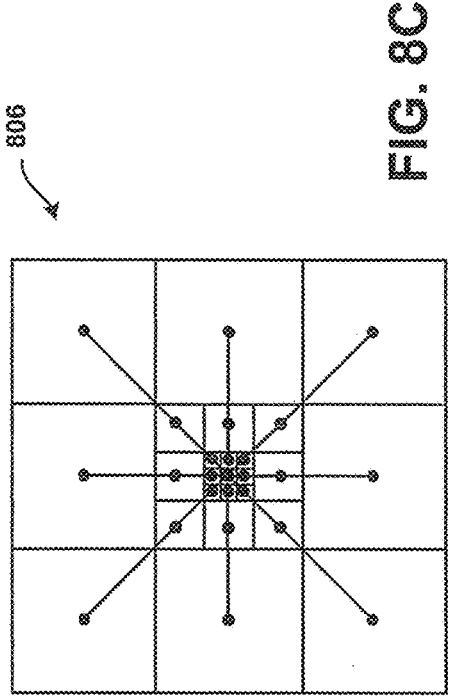
Figure 9A:
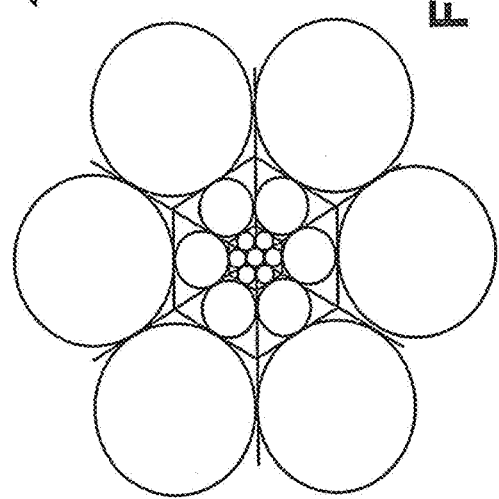
FIGS. 9A-9D are block diagrams illustrating a few example embodiments of the context menu interfaces using a plurality of different geometries and cell arrangements.
Figure 9B:
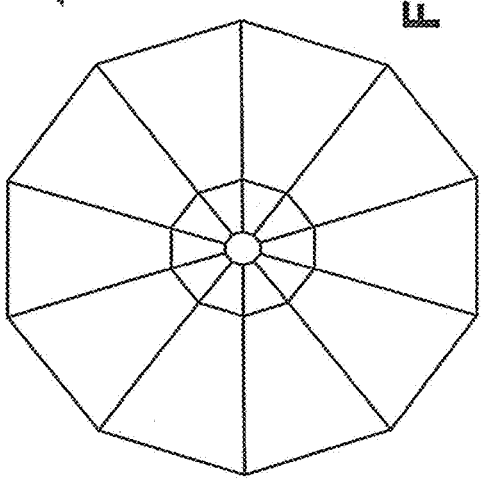
Figure 9C:
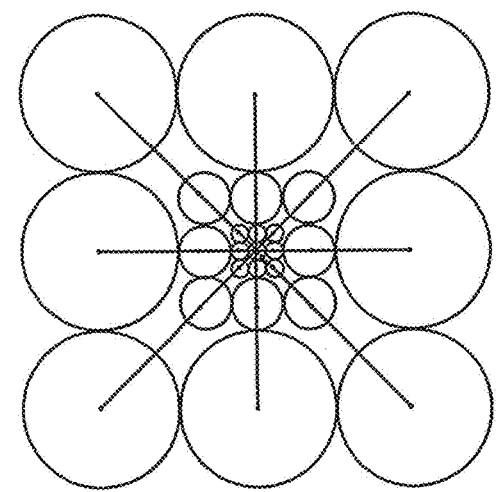
Figure 9D:
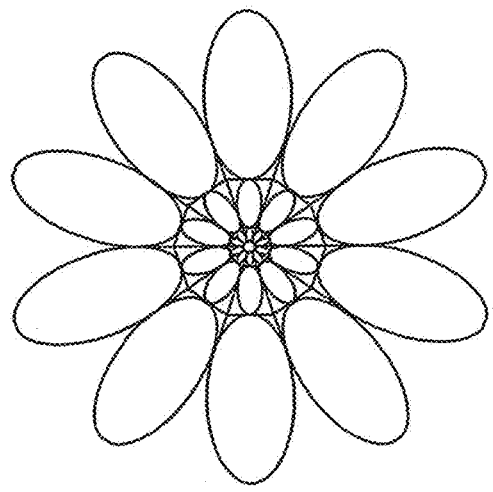

FIGS. 8A-8C are block diagrams illustrating three example configurations of context menu interfaces 802-806 created based on the principles described in reference to FIGS. 6-7. The interfaces 802, 804, and 806 consist of two-dimensional arrangements of 9, 17, and 25 square-shape cells, respectively. The target choices of each context menu interface are arranged in a series of rings, where the inner cell is of size $w_0$, and the first outer ring of cells is also of size $w_0$. The widths/heights of the targets on the consecutive rings are then determined based on the principles described in relation to the preceding figures. Thus, the width/height of each target on the second outer ring in FIGS. 8B and 8C is $3w_0$, and the width/height of each target on the third outer ring in FIG. 8C is $9w_0$.

The two-dimensional arrangement of the context menu ("M") interface can be defined as a function of three variables, $M(w_0, w_1, r)$, where the size of the inner cell is $w_0$, the size of the first outer ring of cells is $w_1$, and the number of rings around the central cell is "r." The sizes of the rings beyond the first one can be determined using the following equation, which shows the width for the $k^{th}$ ring.

$$w_k = w_1\left(1 + \frac{2w_1}{w_0}\right)^{k-1} \quad \text{EQN(15)}$$

Thus, for the context menu interface in FIG. 8C, with M(1,1,3), the total size (width or height) of the context menu interface $M(w_0, w_1, r)$ is:

$$\text{SIZE} = w_0 + 2\sum_{i=1}^{r} w_1\left(1 + \frac{2w_1}{w_0}\right)^{r-1} = w_0\left(1 + \frac{\left(1 + \frac{2w_1}{w_0}\right)^r - 1}{w_1}\right) \quad \text{EQN(16)}$$

For the M(1,1,3) context menu interface, we have $w_0=w_1=1$, and r=3, and SIZE=27, the entire menu has height and width 27. It should be understood that the configurations of the context menu interfaces shown in FIGS. 8A-8C are only examples, and different configurations as possible as well. For example, the context menu interface is not limited to using any specific shapes to represent selection choices, and the selection choices could take many different formats or shapes. FIGS. 9A-9D are block diagrams illustrating a few example embodiments of the context menu interfaces 902, 904, 906, and 908 using different geometries and cell arrangements. The example context menu interfaces 902, 904, 906, and 908 preferably preserve the same properties as the square context menu interfaces illustrated and discussed in relation to FIGS. 8A-8C. Therefore, the illustrated interfaces 902, 904, 906, and 908 preserve the properties of increasing cell sizes as the distance increases from the center cell, and the size of each cell is controlled in such a manner as to preserve the substantially constant time relationship.

Referring to specific examples given in reference to FIGS. 9A-9D, the context menu interface 902 includes 26 circular selection choices. Then, the interfaces 904, 906, and 908 are radial geometry interfaces. More specifically, the interfaces 904 and 906 include 19 circular selection targets and 31 elliptical selection targets, respectively, while the interface 908 includes 31 polygonal sector shaped selection targets. It should be understood that, while all four interfaces include three rings of selection choices, more or fewer number of rings, and thus, more or fewer selection targets could be used in relation to each interface.

The interfaces described above provide a number of selection choices that can be selected in substantially the same time; however, in the environments where a user is rapidly making a selection, while relying on spatial memory and muscle memory rather than visual guidance to move a mouse or a different selection means in the correct direction for the correct distance, the user can sometimes make a wrong selection due to positioning errors relative to the perceived width and height of the target. Since most positioning errors often occur around the boundaries of the selection choices, it might be desirable to slightly shrink the target sizes so that the selection targets are not exactly adjacent. In such an embodiment, most errors would result not in an incorrect selection, but rather in making no selection at all, since the incorrectly positioned mouse would often lie in a buffer region between valid selection choices. Such error-reduction context menu interface configurations may be especially beneficial when used in relation to trading interfaces, in which avoiding the possibility of selecting a wrong choice may make an enormous difference to the trader.

Figure 10:
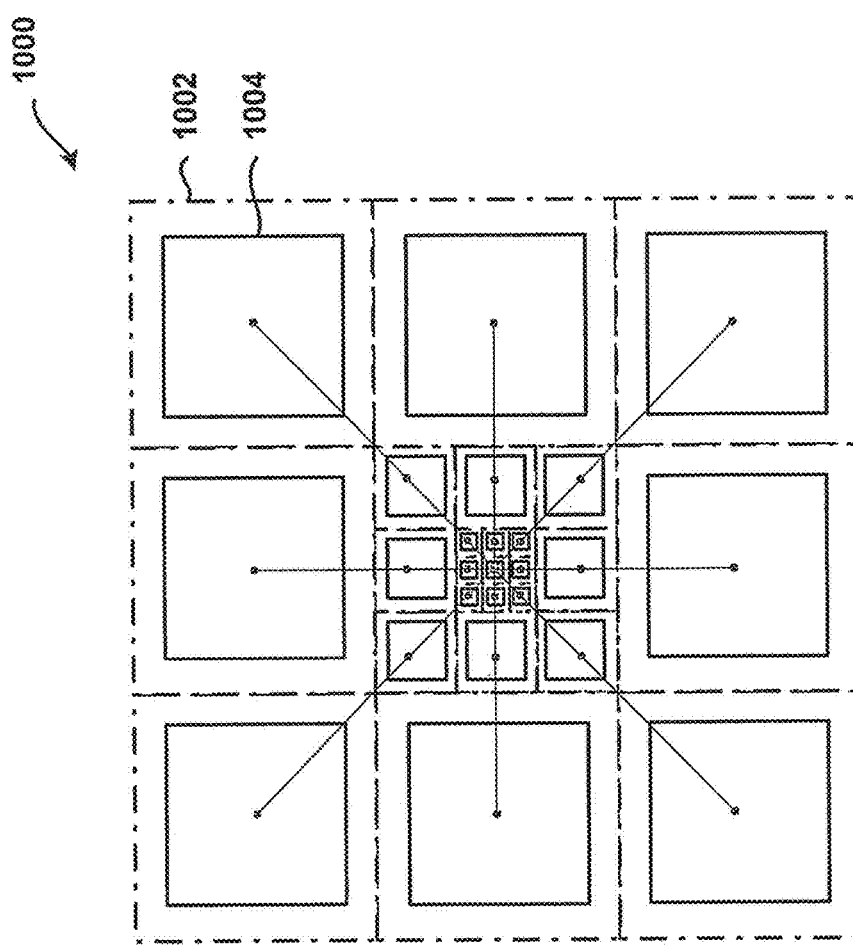
FIG. 10 is a block diagram illustrating an example embodiment of an error-sensitive context menu interface.

FIG. 10 is a block diagram illustrating an embodiment of an error-sensitive context menu interface 1000. The interface 1000 corresponds to a modified version of the interface 806 in FIG. 8C, where each target selection choice of the interface 806 has been reduced in size so that no two targets are adjacent to each other. FIG. 10 shows the actual selection targets of the error-sensitive context menu interface 1000 shown with solid lines, such as a selection target 1004, as compared to the original target sizes shown with dotted lines, such as a selection target shown at 1002, for example. It should be understood that the dotted lines are preferably not drawn when the context menu 1000 is displayed, and are shown in FIG. 10 only for the illustrative and comparison purposes. Also, it should be understood that, while FIG. 10 displays a symmetrical arrangement of the selection target, different embodiments are also possible, where symmetry is not preserved, for example.

Using the error-sensitive context menu interface 1000, a user could define a number of desired actions to be taken in response to detecting an invalid selection. In one embodiment, when a selection is made while the mouse or a different selection means is positioned in a buffer zone, the context interface may be deactivated, and no action will be taken in response to the invalid selection. Also, a user could be alerted with an audible and/or visual warning that no selection has been made. In an alternative embodiment, rather than removing the context interface from the display when an invalid selection choice is made, an audible or a visual warning may be triggered, and a user may be given an opportunity to select the intended item.

Since errors that occur are mostly positioning errors relative to the perceived width and height of the targets, simply drawing the target slightly smaller may serve to have the effect of causing the user to take more care in the positioning movement. In such an embodiment, if the boundaries separating the item choices in the original version of the diagram are used to determine which choice has been selected, and because the actual choices have been drawn slightly smaller within those boundaries, the net effect will be a reduction in error rates, depending on how much of a visual buffer is provided in drawing the diagram.

Figure 11:
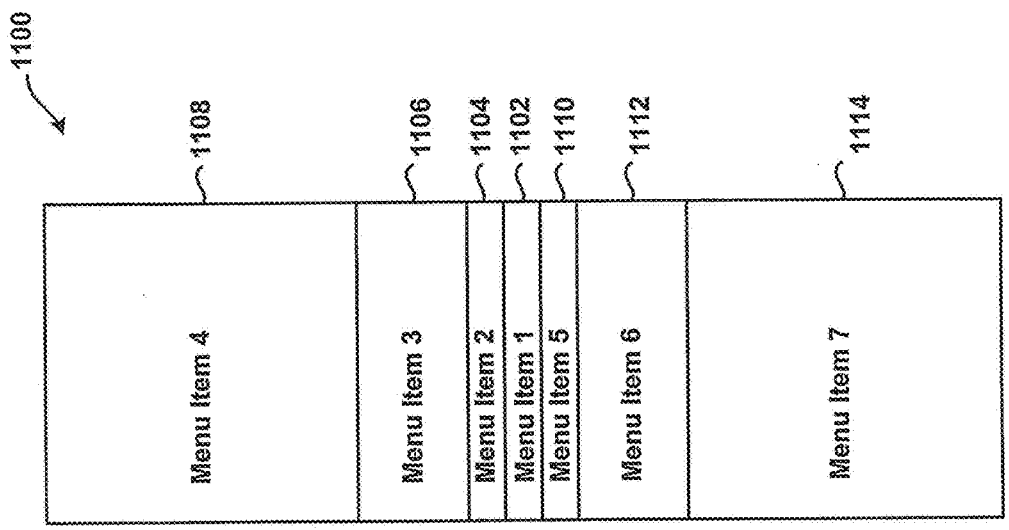
FIG. 11 is a block diagram illustrating an example one-dimensional context menu interface.

The context menu interfaces shown in relation to the preceding figures were all two-dimensional interfaces; however, it should be understood that one-dimensional context menu interface could also be created using the Fitts' law principles described above. Similarly, a three-dimensional context menu could be constructed according to the same principles for use with a display that renders a three-dimensional scene and is capable of translucent display. FIG. 11 is a block diagram illustrating an example one-dimensional context menu interface 1100. The interface 1100 includes a plurality of selection choices 1102, 1104, 1106, 1108, 1110, 1112, and 1114 arranged in a column. However, it should be understood that different layouts for selection choices could also be used, such as placing all or some choices in a row, or at some user-defined angle, for example. Also, the height of each selection choice in the interface 1100 may be determined using the Fitts' law principles, so that it takes substantially the same time to select each choice when the selection means, such as a mouse, is initially positioned at the selection choice 1102. In the embodiment illustrated in FIG. 11, the heights of the selection choices 1104 and 1110 are the same as the height corresponding to the selection choice 1102, then the heights of the selection choices 1106 and 1112 are three times the height of the selection 1106, and the heights of the selection choices 1108 and 1114 are nine times the height of the selection choice 1102. However, it should be understood that different heights for the selection choices could also be used. Also, it should be understood that more or fewer selection choices could be provided in relation to the one-dimensional context menu interfaces.

4. Context Menu Interface and Trading Interface

Figure 12:
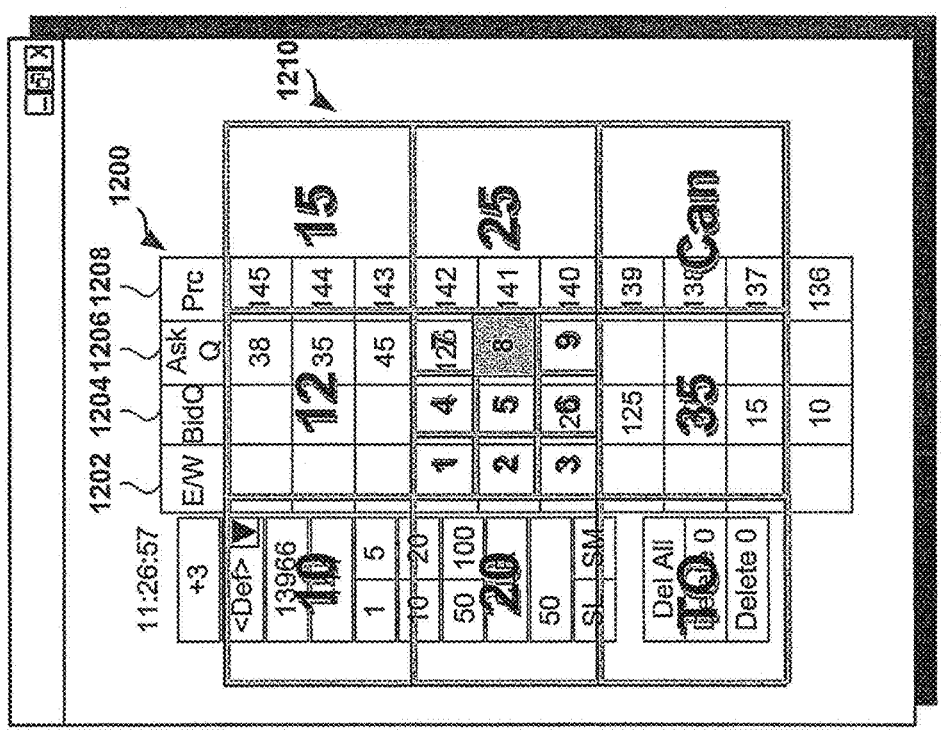
FIG. 12 is a block diagram illustrating one example implementation of a context menu interface that is used in relation to a trading interface.

FIG. 12 is a block diagram illustrating one example implementation of a context menu interface 1210 that is used in relation to a trading interface 1200.

The trading interface 1200 is the MD Trader™-style display; however, it should be understood that different interface types could also be used. The trading interface 1200 arranges the market information in an easy to read fashion by orienting working orders, as well as bid and ask quantities as shown at 1202, 1204, and 1206 along a common price axis 1208. The representative prices for the given tradeable object are shown in a price column, where the prices are arranged in a numerical order in increments. It should be understood that prices may be of the static-type, such as when prices normally do not move until a repositioning command is received, or of the dynamic-type, such as when prices normally move. A display like the one shown in FIG. 12 also allows a trader to enter orders by selecting a price cell that is situated along the common price axis 1208. More information related to placing orders using the display illustrated in FIG. 12 can be found in the applications referenced above in relation to FIG. 4.

As mentioned in relation to the earlier figures, the context menu interface 1210 can be activated upon detecting a user input associated with a request to activate the context menu interface. In one embodiment, when the context menu interface 1210 is displayed in relation to the underlying interface, it is preferably centered on the current location of the input means at the time of detecting an activation request input. In FIG. 12, for example, the context menu interface 1210 was activated upon detecting a user input in relation to the cell in the BidQ column 1204 corresponding to the price level of 141.

In one example embodiment, the position of the input means in relation to the underlying interface at the time when the context menu interface is activated may dictate the types of selection choices provided in relation to the context menu interface. For example, if the context menu interface 1210 is used in relation to a trading interface, as in this example, and a user activates the context menu interface 1210 when the mouse cursor is positioned in relation to a price level for an order, the context menu interface 1210 may provide a number of selection choices corresponding to different order quantities, order types, any actions that can be taken in relation to an order, or the combination thereof. Also, in such an embodiment, a different set of choices may be provided in relation to the context menu interface 1210 if the interface 1210 is activated upon selecting a cell in the BidQ column 1204 and the AskQ column 1206. Alternatively, the user input activating the context menu interface 1200 may dictate selection choices that will be provided in relation to the interface 1200. Further, alternatively, it should be understood that the types of selection choices provided in relation to a context menu interface could be user-configurable.

In the embodiment illustrated in FIG. 12, the context menu interface 1210 includes a number of selection choices corresponding to different order quantities, and to two actions: "Can" corresponding to a request to cancel the selected quantity, and "TO," which corresponds to a trade-out request action. However, in an alternative embodiment, the context menu interface could display the combination of order quantities and order types. In another embodiment, upon detecting a selection input in relation to the context menu interface 1210, such as detecting a selection of an order quantity, another context menu interface could be activated to display a different set of selection choices, such as order types, for example. In such an embodiment, the second context menu interface may be centered at the location of the cell corresponding to the selected order quantity. It should be understood that different embodiments are possible as well.

When the context menu interface 1210 is displayed in relation to the trading interface 1200, the cell boundaries corresponding to each choice as well as the content of each cell may be visible, while the background of each cell may be translucent or transparent so that a user can easily view the contents of the underlying interface. To make the cell boundaries and contents easily visible, and to ensure that they can be distinguished by the user from the background interface, the boundaries and cell content can be displayed using one color, with a shadow of a contrasting color to help visually separate the foreground element from the background, such as the shadow illustrated in relation to each cell boundary and each cell content shown in FIG. 12. Alternatively, the cells and the selection choices corresponding to each cell may be surrounded with a contrasting color, as opposed to just drawing a shadow. It should be understood that different embodiments for easily distinguishing foreground selection choices and underlying choices could also be used. Also, it should be understood that, based on the user preferences, the selection choices displayed in relation to each cell could be solid or partially transparent.

As mentioned in reference to earlier figures, a user can select a cell on the context menu interface 1210 using different methods. According to one method in which the context menu interface 1210 is activated by pressing and holding the right mouse button, for example, the selection action may take place once a user positions the mouse at the desired selection choice, while still holding the mouse button down, and then releases the right mouse button. However, it should be understood that different embodiments for selecting a desired selection choice are possible as well. For example, a user could right mouse click to activate the context menu interface 1210, and then once again right/left mouse button click to select a desired choice on the context menu interface.

It should be understood that the context menu interface 1210 could be configured to operate in a system modal mode, which may cause the context menu interface to be the only interface that receives mouse inputs or detects mouse movements until the context menu interface 1210 is dismissed, by making a choice, canceling the operation, or by receiving any other user input. However, it should be understood that different implementations are possible as well. Also, any operation selected in relation to the context menu interface 1200 can be cancelled by pressing the Escape key, by choosing a cell associated with a "cancel" action, or, in the embodiment where a selection is made upon releasing a pressed-down mouse button, by releasing the right mouse button when the mouse is not over any cell. Upon detecting a cancellation request, the context menu interface 1210 may be removed from the display, and no action is taken. However, while the context menu interface 1210 is displayed, and when the mouse is over a cell, the background of that cell could be colored and optionally translucent, and the cell contents could be drawn in a different color to visually distinguish the current selection, such as a cell corresponding to an order quantity of 8 in FIG. 12.

In the embodiment using the context menu interface 1210 in relation to the trading interface 1200, the central cell of the interface 1210 could be configured to have the same value as had been previously associated with, for example, the right mouse button user action, so that when the context menu 1210 is activated, the trader may select the central selection choice without moving the mouse. Such an embodiment may be especially beneficial, since it may facilitate an easy migration by a trader to use the context menu interface 1210 in relation to the trading interface 1200, while preserving the semantics of user's old habits.

Also, it should be understood that the selection choices associated with each context menu interface cell may be user configurable. In such an embodiment, the example embodiments described above may be especially beneficial to a trader who in advance has given some consideration as to what values/actions/functions the trader wants to use in relation to different cells of the context menu interface 1210. If a trader is familiar with choices given in relation to the context menu interface 1210, the trader will not have to press the mouse button, visually find and recognize each choice, and then move the mouse to the cell location associated with the desired choice, and then release the mouse button or click on the desired choice. Rather, a trader who knows a cell that he wishes to select will begin moving the mouse in that direction as soon as the initial mouse button is initially depressed. Therefore, in the embodiment where a trader enables the context menu interface 1210 by depressing the right/left mouse button, then quickly moves the mouse in a desired location of a selection choice, and then releases the mouse button at the location of the selection choice, results in a very quick selection process of desired order related parameters, or in performing any other action associated with the selection choice.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for displaying the context menu interface may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method comprising:
receiving, by a computer device, a command via a user input device to select an order entry location corresponding to a price level to initiate a trade order to buy or sell a tradeable object at the price level;
in response to receiving the command, displaying, by a computer device, a context pop-up interface comprising a plurality of selection areas organized around a central area of the context pop-up interface, wherein the context pop-up interface is displayed in relation to the selected order entry location, wherein the plurality of selection areas comprises a plurality of order quantity values for the trade order, wherein the plurality of selection areas increases in size as a distance from each of the plurality of selection areas to the central area increases, and wherein the size of each of the plurality of selection areas is determined such that each of the plurality of selections areas can be selected in approximately the same time;
selecting, by a computer device, a selection area of the plurality of selection areas to set a desired order quantity for the trade order, wherein the desired order quantity corresponds to the selection area; and
setting, by a computer device, the desired order quantity for the trade order in response to the selection of the selection area.

2. The method of claim 1, wherein the order entry location is in an order entry region comprising a plurality of order entry locations, each location of the plurality of order entry locations corresponding to a different price level.

3. The method of claim 2, further comprising:
displaying the order entry region.

4. The method of claim 2, wherein the plurality of order entry locations is arranged along a price axis.

5. The method of claim 1, wherein the command comprises a selection of the order entry location with a pointer of a user input device.

6. The method of claim 1, wherein the plurality of selection areas are arranged in a plurality of regions surrounding the central area, and wherein each region comprises a plurality of selection areas of approximately the same size.

7. The method of claim 1, wherein at least one of the plurality of selection areas further comprises an order type.

8. The method of claim 1, wherein a size of each selection area of the plurality of selection areas is determined based on an equation representing a movement time to a selection area of the plurality of the selection areas, wherein the equation comprises a logarithmic function of "A/W," wherein "A" is a movement time to the selection area of the plurality of selection areas, and "W" is a width of the selection area of the plurality of selection areas.

9. The method of claim 1, wherein the plurality of selection areas are organized radially around the central area.

10. The method of claim 1, wherein the central area comprises a central selection area.

11. The method of claim 1, wherein placement of the central areas is based on the selected order entry location.

12. The method of claim 1, wherein, in response to setting the desired order quantity, the trade order to buy or sell the desired order quantity of the tradeable object at the price level is sent to an electronic exchange.

13. The method of claim 1, further comprising:
displaying an indicator in relation to the order entry location, wherein the indicator corresponds to an order quantity pending at the price level for the tradeable object at an electronic exchange.

14. The method of claim 1, wherein a shape of each selection area is user configurable.

15. The method of claim 1, wherein the command comprises a mouse down action to activate the context pop-up interface.

16. The method of claim 1, wherein the selection area is selected upon detecting a user action comprising a mouse down action to activate the context pop-up interface, a mouse pointer movement in a direction of the selection area, and mouse up action to select the selection area.

17. The method of claim 1, wherein the plurality of selection areas and the central area form a multi-dimensional context pop-up interface.

18. The method of claim 1, wherein the plurality of selection areas and the central selection area form a one-dimensional context pop-up interface.

* * * * *